United States Patent
Hayata et al.

(10) Patent No.: US 8,003,735 B2
(45) Date of Patent: Aug. 23, 2011

(54) POLYCARRBONATE RUBBERY ELASTOMER THERMOPLASTIC RESIN COMPOSITION AND MOLDED BODY

(75) Inventors: Yusuke Hayata, Chiba (JP); Akio Nodera, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 465 days.

(21) Appl. No.: 11/721,101

(22) PCT Filed: Dec. 2, 2005

(86) PCT No.: PCT/JP2005/022155
§ 371 (c)(1),
(2), (4) Date: Jun. 7, 2007

(87) PCT Pub. No.: WO2006/062032
PCT Pub. Date: Jun. 15, 2006

(65) Prior Publication Data
US 2009/0234075 A1    Sep. 17, 2009

(30) Foreign Application Priority Data
Dec. 8, 2004    (JP) .................................. 2004-355836

(51) Int. Cl.
*C08L 69/00* (2006.01)
*C08L 67/04* (2006.01)
(52) U.S. Cl. ........... 525/450; 525/67; 525/146; 525/464
(58) Field of Classification Search .................. None
See application file for complete search history.

(56) References Cited

U.S. PATENT DOCUMENTS

| | | | | |
|---|---|---|---|---|
| 2,739,142 A | * | 3/1956 | Jones | 526/342 |
| 5,847,011 A | * | 12/1998 | Terado et al. | 521/48 |
| 5,952,450 A | | 9/1999 | Ishihara et al. | |
| 6,653,391 B1 | * | 11/2003 | Weber et al. | 524/504 |
| 6,710,135 B2 | | 3/2004 | Tan et al. | |
| 7,217,757 B2 | | 5/2007 | Nodera | |
| 2002/0006516 A1 | * | 1/2002 | Ito et al. | 428/424.2 |
| 2004/0132877 A1 | * | 7/2004 | Seidel et al. | 524/115 |
| 2008/0051508 A1 | * | 2/2008 | Hayata et al. | 525/68 |
| 2008/0108754 A1 | * | 5/2008 | Hayata et al. | 525/191 |

FOREIGN PATENT DOCUMENTS

| | | | |
|---|---|---|---|
| JP | 7-109413 | | 4/1995 |
| JP | 8-259789 | | 10/1996 |
| JP | 09176480 | * | 7/1997 |
| JP | 11 140292 | | 5/1999 |
| JP | 11279380 | * | 10/1999 |
| JP | 2002 114899 | | 4/2002 |
| JP | 2002 220527 | | 8/2002 |
| JP | 2005-48066 | | 2/2005 |
| JP | 2005048067 | * | 2/2005 |
| JP | 2005-120322 | | 5/2005 |
| JP | 2006-28299 | | 2/2006 |
| WO | WO 02/059205 | | 8/2002 |
| WO | WO 2004/003079 A1 | | 1/2004 |

OTHER PUBLICATIONS

Ashford's Dictionary of Industrial Chemicals; 1995; p. 527.*
Grant and Hachk's Chemical Dictionary 5$^{th}$ Edition; no date; p. 287.*
U.S. Appl. No. 11/718,895, filed May 9, 2007, Hayata, et al.

* cited by examiner

*Primary Examiner* — David Buttner
(74) *Attorney, Agent, or Firm* — Oblon, Spivak, McClelland, Maier & Neustadt, L.L.P.

(57) ABSTRACT

Provided is a thermoplastic resin composition having high impact resistance at low temperature and molded articles with good appearance using the thermoplastic resin composition. The thermoplastic resin composition contains 0.5 to 20 parts by mass of a rubbery elastomer (B) relative to 100 parts by mass of a resin mixture (A) comprising 45 to 97% by mass of a polycarbonate resin (a-1) and 55 to 3% by mass of a fatty acid polyester (a-2), wherein the component (B) is dispersed in the component (a-1).

23 Claims, No Drawings

POLYCARRBONATE RUBBERY ELASTOMER THERMOPLASTIC RESIN COMPOSITION AND MOLDED BODY

TECHNICAL FIELD

The present invention relates to a thermoplastic resin composition. It relates in more detail to a thermoplastic resin composition having high impact resistance at low temperature, improved mechanical properties, flowability and appearance.

Further, such thermoplastic resin composition can be applied to electric and electronic equipment such as office automation equipment, information and communication equipment, home appliances and the like, the automotive field, the building and construction field, and the like.

BACKGROUND ART

Polycarbonate/polylactic acid alloys have drawn attention in terms of reduction of environmental load since polylactic acid is a plant-based resin. Alloying with polylactic acid is effective for increasing the flowability of polycarbonate (optionally abbreviated as PC hereinafter) because of the characteristics of high flowability of polylactic acid, since polycarbonate itself has low flowability.

Also, when polylactic acid is alloyed with polycarbonate and then burned, it is considered to release reduced amount of toxic gases because of its chemical structure, so that it is a promising resin useful in the field of office automation equipment, home appliances, and the like, where flame resisting specification is required.

Conventional PC-polyester alloys are superior in heat resistance and chemical resistance, but poor in flowability, so that alloying with styrene type resins or addition of plasticizers is generally used in order to increase the flowability of PC (for example, refer to Patent document 1). However, attempt to improve the flowability of PC/polyester alloys causes such problem that an ester exchange reaction between resins may lower impact resistance and flame retardancy. PC/poly lactic acid alloys are also similarly low in impact resistance, which has to be improved.

It is generally known that addition of a rubbery elastomer is effective for improving impact resistance of polymer alloys. For example, when a rubbery elastomer with an acrylic structure is added to PC/poly lactic acid alloys, affinity of polylactic acid with the acrylic structure allows dispersion of the rubbery elastomer into polylactic acid to give a resin composition having high impact resistance and high flowability. However, such resin composition is not sufficient in impact resistance at low temperature, hence a resin composition having higher impact resistance at low temperature is requested.

Further, difference in the refractive index between PC and polylactic acid causes defective appearance phenomenon with pearlescence in the PC/poly lactic acid alloy. This defect in appearance makes it difficult to control the glossiness level of pearlescence, which is undesirable in terms of cost because the number of processes in aftertreatment of molded articles, for example, painting and plating processes, are increased.
Patent document 1: Japanese Patent Application Publication No. H7 (1995)-68445

DISCLOSURE OF THE INVENTION

Problems to be Solved by the Invention

The present invention has been initiated to address the above problems and has an object to provide a thermoplastic resin composition with improved impact resistance at low temperature and molded articles with good appearance using the thermoplastic resin composition.

Means for Solving the Problems

The present inventors earnestly studied to solve the above problems and found that the above object can be achieved by a thermoplastic resin composition, wherein a rubbery elastomer is blended in a given proportion to a resin mixture comprising a polycarbonate resin and a fatty acid polyester in a particular ratio. The present invention is completed based on such findings.

That is, the present invention provides the following thermoplastic resin composition and molded articles thereof.
1. A thermoplastic resin composition containing 0.5 to 20 parts by mass of a rubbery elastomer (B) relative to 100 parts by mass of a resin mixture (A) comprising 45 to 97% by mass of a polycarbonate resin (a-1) and 55 to 3% by mass of a fatty acid polyester (a-2), wherein the component (B) is dispersed in the component (a-1).
2. The thermoplastic resin composition described above in 1, wherein the polycarbonate resin of component (a-1) is a polycarbonate-polyorganosiloxane copolymer or a polycarbonate resin containing a polycarbonate-polyorganosiloxane copolymer.
3. The thermoplastic resin composition described above in 1 or 2, wherein the fatty acid polyester of component (a-2) is polylactic acid and/or a copolymer of a lactic acid homolog with other hydroxycarboxylic acid.
4. The thermoplastic resin composition described above in any of 1 to 3, wherein the rubbery elastomer of component (B) is a rubbery elastomer containing one kind or more selected from an acrylonitrile-styrene type copolymer, a core-shell rubber having a polyamide structure and a core-shell rubber having a poly ether structure.
5. The thermoplastic resin composition described above in any of 1 to 4, applied to office automation equipment, information and communication equipment, automotive parts or home appliances.
6. Molded articles comprising the thermoplastic resin composition described above in any of 1 to 5.

Effects of the Invention

Dispersing a rubbery elastomer in a PC resin improves impact resistance at low temperature without reducing flowability of a PC resin/fatty acid polyester alloy and prevents lowering of rigidity. Also, the rubbery elastomer dispersed in the PC resin causes diffusion of light to reduce defective appearance of molded articles.

Furthermore, use of a polycarbonate-polyorganosiloxane copolymer improves impact resistance and flame retardancy.

BEST MODE FOR CARRYING OUT THE INVENTION

In the thermoplastic resin composition of the present invention, the polycarbonate resin of component (a-1) in component (A) is not particularly limited to, and includes various ones, of which a polymer having a recurring unit with the structure represented by general formula (1) is preferred.

[Formula 1]

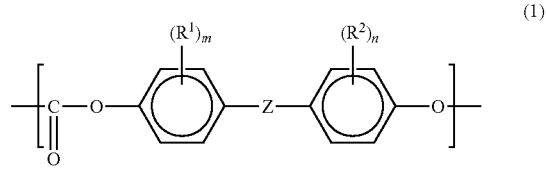

In above general formula (1), each of $R^1$ and $R^2$ is a halogen atom (for example, chlorine, fluorine, bromine and iodine) or a $C_1$-$C_8$ alkyl group (for example, methyl group, ethyl group, propyl group, isopropyl group, butyl groups (n-butyl, isobutyl, sec-butyl, and tert-butyl groups), pentyl groups, hexyl groups, heptyl groups, and octyl groups).

The symbols m and n each are an integer of 0 to 4, and $R^1$ may be identical or different when m is 2 to 4, and $R^2$ may be identical or different when n is 2 to 4.

Z represents a $C_1$-$C_8$ alkylene group or a $C_2$-$C_8$ alkylidene group (for example, methylene, ethylene, propylene, butylene, pentylene, hexylene, ethylidene, isopropylidene, and the like), a $C_5$-$C_{15}$ cycloalkylene group or a $C_5$-$C_{15}$ cycloalkylidene group (for example, cyclopentylene, cyclohexylene, cyclopentylidene, cyclohexylidene, and the like), a single bond, —$SO_2$—, —SO—, —S—, —O— or —CO— bond or a bond represented by following formulas (2) or (2').

[Formula 2]

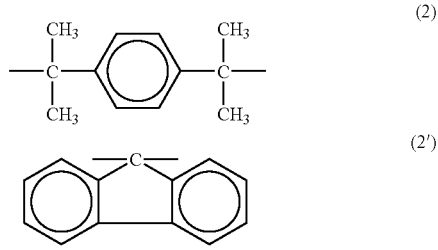

The above polymer is readily manufactured by generally reacting a divalent phenol represented by general formula (3),

[Formula 3]

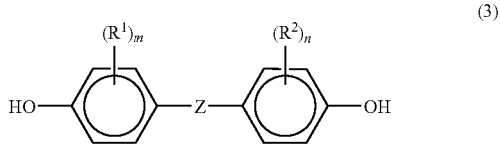

with a carbonate precursor such as phosgene and the like, [wherein in the formula, $R^1$, $R^2$, Z, m and n are the same as those in general formula (1) above].

That is, for example, the above polymer can be manufactured by reacting a divalent phenol with a carbonate precursor such as phosgene in a solvent such as methylene chloride, and the like in the presence of a known acid acceptor and a molecular-weight-modifier. It can be also manufactured by an ester exchange reaction of a divalent phenol with a carbonate precursor such as a carbonate ester compound.

Divalent phenols represented by general formula (3) above include various ones. 2,2-Bis(4-hydroxyphenyl)propane (commonly called bisphenol A) is particularly preferred.

The divalent phenols other than bisphenol A include bis(4-hydroxylphenyl)alkanes such as bis(4-hydroxyphenyl)methane, 1,1-bis(4-hydroxyphenyl)ethane, 1,2-bis(4-hydroxylphenyl)ethane, and the like, bis(4-hydroxyphenyl) cycloalkanes such as 1,1-bis(4-hydroxylphenyl)cyclohexane, 1,1-bis(4-hydroxyphenyl)cyclodecane, and the like, 4,4'-dihydroxydiphenyl, bis(4-hydroxyphenyl) oxide, bis(4-hydroxyphenyl) sulfide, bis(4-hydroxyphenyl) sulfone, bis(4-hydroxyphenyl)sulfoxide, bis(4-hydroxyphenyl) ketone and the like.

In addition to these, the divalent phenols include hydroquinone, and the like.

These divalent phenols each may be used singly or as a mixture of two kinds or more.

Carbonate compounds include, for example, diaryl carbonates such as diphenyl carbonate, and the like and dialkyl carbonates such as dimethyl carbonate, diethyl carbonate, and the like.

The polycarbonate resin may be a homo polymer using single kind of the above divalent phenols or a copolymer using two kinds or more of them.

Furthermore, there may be also used a thermoplastic random-branched polycarbonate resin obtained by use of multifunctional aromatic compounds in combination with the above divalent phenols.

Such multifunctional aromatic compounds are generally called a branching agent and specifically include 1,1,1-tris(4-hydroxyphenyl)ethane, α,α',α"-tris(4-hydroxyphenyl)-1,3,5-triisoproylbenzene, 1-[α-methyl-α-(4'-hydroxyphenyl)ethyl]-4-[α',α'-bis(4"-hydroxphenyl)ethyl]benzene, phloroglucin, trimellitic acid, isatin bis(o-cresol), and the like.

Polycarbonate resins with such features are commercially available as aromatic polycarbonate resins, for example, Tarflon FN3000A, FN2500A, FN2200A, FN1900A, FN1700A, and FN1500 (trade name; manufactured by Idemitsu Kosan Co., Ltd.).

The polycarbonate resin used in the present invention, in addition to the homopolymer manufactured using the above divalent phenols alone, also includes a polycarbonate-polyorganosiloxane copolymer (optionally abbreviated as PC-POS copolymer hereinafter) or a polycarbonate resin containing the PC-POS copolymer, which is preferred because of improving impact resistance and flame retardancy. The PC-POS copolymer by itself is more preferred.

PC-POS copolymers may be in various forms, and are preferably the one comprising a polycarbonate section having a recurring unit with the structure represented by the following general formula (1),

[Formula 4]

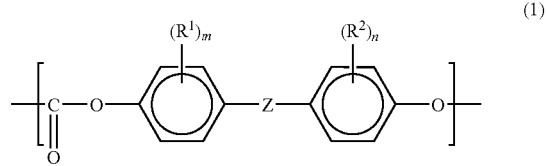

[wherein in the formula, $R^1$, $R^2$, Z, m and n are the same as the above], and a polyorganosiloxane section having a recurring unit with the structure represented by the following general formula (4),

[Formula 5]

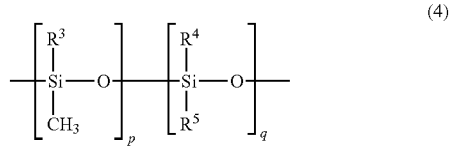

[wherein in the formula, each of $R^3$, $R^4$ and $R^5$ is a hydrogen atom, a $C_1$-$C_5$ alkyl group (for example, methyl, ethyl, propyl, n-butyl, isobutyl, and the like) or a phenyl group, and p and q each are 0 or an integer of 1 or larger, and the sum of p and q is an integer of 1 or larger].

Here, the degree of polymerization in the polycarbonate section is preferably 3 to 100, and that in the polyorganosiloxane section is preferably 2 to 500.

The above PC-POS copolymer is a block copolymer comprising the polycarbonate section having a recurring unit represented by general formula (1) above and the polyorganosiloxane section having a recurring unit represented by general formula (4) above.

Such PC-POS copolymers can be manufactured, for example, by interfacial polycondensation reaction, wherein a polycarbonate oligomer (abbreviated as PC oligomers hereinafter) prepared in advance forming the polycarbonate section and a polyorganosiloxane having a reactive terminal group (for example, polydialkylsiloxane such as polydimethylsiloxane (PDMS), polydiethylsiloxane and the like, or polymethylphenylsiloxane and the like) forming the polyorganosiloxane section are dissolved in a solvent such as methylene chloride, chlorobenzene, chloroform, and the like, to which a sodium hydroxide aqueous solution of bisphenol is added and triethylamine, trimethylbenzylammonium chloride, or the like is used as a catalyst.

Further, a PC-POS copolymer manufactured according to a method described in Japanese Patent Application Publication No. S44 (1969)-30105 or Japanese Patent Application Publication No. S45 (1970)-20510 may be also used.

Here, PC oligomers with a recurring unit represented by general formula (1) can be readily manufactured by a solvent method, that is, by reacting the above divalent phenol represented by general formula (3) with a carbonate precursor such as phosgene or a carbonate ester compound, and the like in a solvent such as methylene chloride, and the like in the presence of a known acid acceptor and a molecular-weight-modifier.

They can be manufactured, for example, by reacting a divalent phenol with a carbonate precursor such as phosgene or an ester exchange reaction of the divalent phenol with the carbonate precursor such as a carbonate ester compound, in a solvent such as methylene chloride, and the like in the presence of a known acid acceptor and a molecular-weight-modifier.

Carbonate ester compounds used include the ones similar to the above and molecular-weight-modifiers used include those similar to the ones described hereinafter.

PC oligomers supplied to manufacture of the PC-POS copolymers in the present invention may be a homopolymer using one kind of the above divalent phenols or a copolymer using two kinds or more of them.

Furthermore, a thermoplastic random-branched polycarbonate resin obtained by using a multifunctional aromatic compound in combination with the above divalent phenols may be also used.

Further, the polycarbonate resin used in the present invention is also preferably the one having a terminal group represented by the following general formula (5),

[Formula 6]

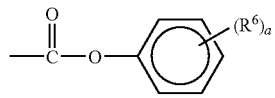
(5)

[wherein in the formula, $R^6$ represents a $C_1$-$C_{35}$ alkyl group and a represents an integer of 0 to 5].

$R^6$ in general formula (5) is a $C_1$-$C_{3-5}$ alkyl group and may be linear or branched.

Also, it may be bonded at p-, m- or o-position, and preferably at p-position.

The polycarbonate resin having the terminal group represented by general formula (5) can be readily manufactured by reacting the divalent phenol with phosgene or a carbonate ester compound.

The polycarbonate resin can be manufactured, for example, by reacting a divalent phenol with a carbonate precursor such as phosgene or by an ester exchange reaction of the divalent phenol with the carbonate precursor such as diphenyl carbonate, in a solvent such as methylene chloride, and the like in the presence of a catalyst such as triethylamine, and the like and a specific chain terminator.

Here, the divalent phenol may be the same or different from the compound represented above by general formula (3).

It may be a homopolymer using one kind of the above divalent phenols or a copolymer using two kinds or more of them.

Furthermore, a thermoplastic random-branched polycarbonate resin obtained by using a multifunctional aromatic compound in combination with the above divalent phenols may be also used.

The carbonate ester compounds may include diaryl carbonates such as the above diphenyl carbonate, and the like and dialkyl carbonates such as dimethyl carbonate, diethyl carbonate, and the like.

Phenol compounds which form the terminal group represented by general formula (5) above may be used as a chain terminator. That is, they are phenol compounds represented by the following general formula (6),

[Formula 7]

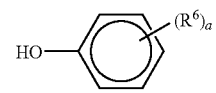
(6)

[wherein in the formula, $R^6$ represents a $C_1$-$C_{35}$ alkyl group and a represents an integer of 0 to 5].

Such alkylphenols include phenol, p-cresol, p-tert-butylphenol, p-tert-octylphenol, p-cumylphenol, p-nonylphenol, docosylphenol, tetracosylphenol, hexacosylphenol, octacosylphenol triacontylphenol, dotriacontylphenol, tetratriacontylphenol, and the like. These may be used singly or as a mixture of two kinds or more.

These alkylphenols may be also used in combination with other phenol compounds as far as the effect thereof is not impaired.

In addition, the polycarbonate resin manufactured by the above method substantially has the terminal group represented by general formula (5) at one or both ends of the molecule.

The viscosity average molecular weight of the polycarbonate resin used as component (a-1) is generally 10,000 to 40,000. When the viscosity average molecular weight is 10,000 or more, the thermoplastic resin composition obtained is sufficient in heat resistance and mechanical strength, while when the viscosity average molecular weight is 40,000 or less, moldability of the thermoplastic resin composition obtained is improved.

The viscosity average molecular weight of this polycarbonate resin is preferably 14,000 to 25,000, more preferably 17,000 to 22,000 in terms of balancing mechanical properties and the like.

The viscosity average molecular weight (Mv) is a value calculated by the formula $[\eta]=1.23\times10^{-5} Mv^{0.83}$ after evaluation of the intrinsic viscosity $[\eta]$, which is obtained by measuring the viscosity of methylene chloride solutions at 20° C. using an Ubbelohde viscometer.

In the thermoplastic resin composition of the present invention, the fatty acid polyester of component (a-2) in component (A) used is preferably polylactic acid or a copolymer of a lactic acid homolog with hydroxycarboxylic acid.

Polylactic acid is generally synthesized by ring-opening polymerization of a cyclic dimer of lactic acid called lactide and a manufacturing method thereof is disclosed in U.S. Pat. Nos. 1,995,970, 2,362,511, 2,683,136 and others.

Also, copolymers of lactic acid with other hydroxycarboxylic acids are generally synthesized by ring-opening polymerization of lactide and a cyclic ester intermediate of the hydroxycarboxylic acid and a manufacturing method thereof is disclosed in U.S. Pat. Nos. 3,635,956, 3,797,499 and others.

When the lactic acid type resin is manufactured by direct dehydration and polycondensation instead of the ring-opening polymerization, a lactic acid homolog and other hydroxycarboxylic acid as needed are polymerized by azeotropic dehydration and condensation preferably in an organic solvent, particularly in the presence of a phenyl ether type solvent, and particularly preferably by returning the solvent to the reaction system, wherein the solvent is made substantially anhydrous by removing water by azeotropic distillation, thus yielding the lactic acid type resin with an appropriate degree of polymerization suitable for the present invention.

A lactic acid homolog used as a raw material may include L- and D-lactic acid, a mixture thereof or lactide as a dimer of lactic acid.

Other hydroxycarboxylic acids, which can be used in conjunction with a lactic acid homolog may include glycolic acid. 3-hydroxybutyric acid, 4-hydroxybutyric acid, 4-hydroxylvaleric acid, 5-hydroxyvaleric acid, 6-hydroxycaproic acid and further cyclic ester intermediates of the hydroxycarboxylic acids, for example, glycoside that is a dimer of glycolic acid, ε-caprolactone that is a cyclic ester of 6-hydroxycaproic acid.

Appropriate molecular-weight-modifiers, branching agents, other modifiers, and the like may be added in manufacture of the lactic acid type resin.

Further, a lactic acid homolog and hydroxycarboxylic acids as a copolymer component may be also used singly or in a combination of two kinds or more and the lactic acid type resin obtained may be further used as a mixture of two kinds or more.

The fatty acid polyester of component (a-2) used in the present invention preferably has a high molecular weight from the aspect of thermal and mechanical properties and preferably has the weight average molecular weight of 30,000 or more.

As the fatty acid polyester, polylactic acid is preferred from the aspect of durability, rigidity and biodegradability.

In the resin mixture of component (A) in the present invention, a content ratio of the polycarbonate resin of component (a-1) to the fatty acid polyester of component (a-2) is in a range of 45:55 to 97:3 by mass ratio, preferably in a range of 60:40 to 90:10.

When the content ratio of component (a-1) to component (a-2) is within the above range, the thermoplastic resin composition of the present invention is good in mechanical strength, thermal stability and molding consistency. Dispersion of a rubbery elastomer in component (a-1) also becomes better in this range.

In the thermoplastic resin composition of the present invention, the rubbery elastomer of component (B) is blended to be dispersed in a PC resin in order to improve the impact resistance at low temperature.

The rubbery elastomer preferably includes an acrylonitrile-styrene type copolymer having high affinity to the PC resin and a core-shell type elastomer having a polyamide structure or polyether structure as a shell in order to be selectively dispersed in the PC resin, and the acrylonitrile-styrene type copolymer is particularly preferred from the aspect of heat resistance and shape stability of the rubbery elastomer.

The rubbery elastomer having the polyamide structure includes the one using a polyamide as a hard segment, for example, polyamide 6, polyamide 66, polyamide 12, and the like and a polyether as a soft segment, for example, PEG. PPG, PMEG and the like.

The average particle diameter of the rubbery elastomer is 100 to 500 nm, preferably 200 to 400 nm. When the average particle diameter of the rubbery elastomer is within the above range, excellent dispersion and large effect of impact resistance improvement can be achieved.

A core-shell type rubbery elastomer has a two-layer structure comprising a core and a shell. This core section is in a soft rubbery state, while the shell section on the surface thereof is in a hard resinous state, and a grafted rubbery elastomer, of which the rubbery elastomer itself is powdery (particulate state) is preferably used.

Even after melt-blending with a resin mixture comprising the PC resin and fatty acid polyester, most of such rubbery elastomers of component (B) keep the original morphology of the particulate state and are uniformly dispersed into the PC resin, so that this rubbery elastomer dispersed in the PC resin can diffuse light to prevent defective appearance such as generation of pearlescence.

In the present invention, a rubbery elastomer which can be dispersed in component (a-2) may be used in combination with the above rubbery elastomer. Such rubbery elastomers include, for example, the one obtained by polymerizing one or two kinds or more of vinyl monomers such as styrene, and the like in the presence of one or two kinds or more of a grafted rubbery polymer obtained from a monomer comprising alkyl acrylates, alkyl methacrylates or dimethylsiloxane as a main component. The amount of blending of such rubbery elastomers is preferably at a proportion of 200% by mass or less with respect to the rubbery elastomer which can be dispersed in component (a-1).

The amount of blending of the rubbery elastomer of component (B) is 0.5 to 20 parts by mass, preferably 1 to 15 parts by mass, more preferably 3 to 10 parts by mass relative to 100 parts by mass of the resin mixture of component (A). When the amount of blending is within the above range, impact resistance is improved without affecting the effect of poly lactic acid for improving flowability.

The thermoplastic resin composition of the present invention can be obtained by blending, melting and kneading the above components of (a-1), (a-2), (B) and further other components as needed.

Such blending and kneading are carried out by using conventional methods, for example, methods using ribbon blenders, Henschel mixers, Bambury mixers, drum tumblers, single screw extruders, twin screw extruders, cokneaders, multi-screw extruders, and the like.

A heating temperature during melting and kneading is generally chosen from a range of 220 to 260° C.

The present Invention also provides molded articles comprising the above thermoplastic resin composition. The molding temperature for the thermoplastic resin composition of the present invention is also generally chosen from a range of 220 to 260° C.

EXAMPLES

The present invention is now described in more detail with Examples, but not limited in any way by such Examples.

Preparation Example 1

PC-2; Preparation of PC-PDMS (Polydimethylsiloxane) Copolymer (1) Preparation of PC Oligomers A sodium hydroxide aqueous solution containing bisphenol A was prepared by dissolving 60 kg of bisphenol A in 400 L of 5% by mass sodium hydroxide aqueous solution.

This sodium hydroxide aqueous solution containing bisphenol A kept at room temperature and methylene chloride were then fed at a flow rate of 138 L/hour and 69 L/hour respectively, through an orifice plate into a tubular reactor with an inner diameter of 10 mm and a tube length of 10 m, to which phosgene was concurrently injected at a flow rate of 10.7 kg/hour to continuously react for three hours.

The tubular reactor used herein was composed of a double-walled tube, in which cooling water was circulated through the jacket portion to keep the exit temperature of the reaction mixture at 25° C.

The pH value of the effluent was adjusted at 10 to 11.

The reaction mixture thus obtained was allowed to stand to separate and remove the aqueous phase and collect a methylene chloride phase (220 L), yielding PC oligomers (concentration, 317 g/L).

The degree of polymerization of the PC oligomers obtained was 2 to 4 and the concentration of the chloroformate group was 0.7 mol/L.

(2) Preparation of Reactive PDMS

A mixture of 1,483 g of octamethylcyclotetrasiloxane, 96 g of 1,1,3,3-tetramethyldisiloxane and 35 g of 86% by mass sulfuric acid was prepared and stirred at room temperature for 17 hours.

The oil phase was then separated, to which 25 g of sodium hydrogencarbonate was added and the resultant mixture was stirred for 1 hour.

After filtration, the reaction mixture was vacuum-distilled at 150° C. and 3 Torr (400 Pa) to remove low boiling products to yield an oil.

The oil weighing 294 g obtained as above was added at 90° C. to a mixture of 60 g of 2-allylphenol and platinum chloride alcoholate complex equivalent to 0.0014 g of platinum.

This mixture was stirred for 3 hours while keeping the temperature at 90 to 115° C.

The reaction product was extracted with methylene chloride and washed with 80% by mass aqueous methanol three times to remove excess 2-allylphenol.

This product was dried over anhydrous sodium sulfate and the solvent was distilled off under vacuum to a temperature of 115° C.

The number of the dimethylsilanoxy recurring unit in the reactive PDMS with phenolic terminal groups obtained was determined by NMR to be 30.

(3) Preparation of PC-PDMS Copolymer

An aliquot of the reactive PDMS weighing 138 g obtained above in (2) was dissolved in 2 L of methylene chloride, with which 10 L of the PC oligomers obtained above in (1) was mixed.

To this mixture were added 26 g of sodium hydroxide dissolved in 1 L of water and 5.7 ml of trimethylamine, and the resultant mixture was reacted while stirring at room temperature and 500 rpm for 1 hour.

After completing the reaction, a solution prepared by dissolving 600 g of bisphenol A in 5 L of 5.2% by mass sodium hydroxide aqueous solution, 8 L of methylene chloride and 96 g of p-tert-butylphenol were added to the above reaction system, and the resultant solution was reacted while stirring at room temperature and 500 rpm for 2 hours.

After completing the reaction, 5 L of methylene chloride was added to the reaction mixture, which was successively washed with 5 L of water, alkaline-washed with 5 L of 0.03 mol/L sodium hydroxide aqueous solution, acid-washed with 5 L of 0.2 mol/L hydrochloric acid and 5 L of water twice and finally methylene chloride was eliminated to yield a flaky PC-PDMS copolymer.

The PC-PDMS copolymer obtained was vacuum-dried at 120° C. for 24 hours. The viscosity average molecular weight was 17,000 and the PDMS content was 4.0% by mass. The PDMS content was determined by the following method.

Evaluation was based on the ratio of intensity in the methyl peak of isopropyl group in bisphenol A observed at 1.7 ppm and that in the methyl peak of dimethylsiloxane observed at 0.2 ppm in $^1$H-NMR.

Examples 1 to 4 and Comparative Examples 1 to 4

Each component in the proportion given in Table 1 was blended and fed to a vented twin screw extruder [model: TEM35; manufactured by Toshiba Machine Co., Ltd.] to melt and knead at 240° C. for pelletization. In all of Examples and Comparative Examples, 0.1 part by mass of a phosphorous based antioxidant (trade name: Adekastab PEP36; manufactured by Asahi Denka Co., Ltd.) and 0.1 part by mass of phenol based antioxidant (trade name: Irganox 1076; manufactured by Chiba Specialty Chemicals Co. Ltd.) as a stabilizer were added.

After the pellets obtained were dried at 100° C. for 10 hours, they were injection-molded at a molding temperature of 240° C. and a mold temperature of 40° C. to yield test specimens. The test specimens obtained were used to evaluate properties according to the following various evaluation tests. The results are shown in Table 1.

Blending components used and methods for property evaluation are given in the following.
[Blending Components]
Component (a-1)
 (PC-1): Polycarbonate resin, FN 1700A [manufactured by Idemitsu Kosan Co., Ltd., bisphenol A polycarbonate resin, viscosity average molecular weight=17,500, the terminal group being a p-tert-butylphenol residue]
 (PC-2): Polycarbonate-polydimethylsiloxane bisphenol A polycarbonate resin (PC-PDMS) (refer to Preparation example 1)
Component (a-2):
 (PLA): Polylactic acid, H100 [manufactured by Mitsui Chemicals Inc.]
Component (B):
Rubbery elastomer-1: Acrylonitrile-styrene/silicone elastomer, SRK-200 [manufactured by Mitsubishi Rayon Co. Ltd.].

Rubbery elastomer-2: Acrylic/butyl acrylate elastomer, W450A [manufactured by Mitsubishi Rayon Co., Ltd.].

[Method to Evaluate Physical Properties]

(1) Flexural Modulus

The specimen with a thickness of 4 mm was used to measure the flexural modulus at 23° C. complying with ASTM D790. Unit is in MPa.

(2) Flowability (SFL)

Flowability was measured at a molding temperature of 260° C. and an injection pressure of 7.85 MPa using a mold with a thickness of 2 mm and a width of 10 mm at a mold temperature of 40° C. Unit is in cm.

(3) Limiting Oxygen Index (LOI)

The limiting oxygen Index was measured complying with ASTM D2863. Unit is in %.

(4) Appearance of Molded Articles

A piece was molded in a rectangular plate of 100×100×2 mm and visually inspected.

Appearance was rated as "Good" for slightly uneven flow and "Excellent" for no uneven flow.

(5) Izod (Izod Impact Strength)

The specimen with a thickness of 3.18 mm was used to measure the Izod impact strength at 23° C. and −30° C. complying with ASTM D256. Unit is in kJ/m².

(2) Comparative Example 1

When the rubbery elastomer is not added, the impact resistance at low temperature is low and defective pearlescent appearance occurs. Flowability is also low.

(3) Comparative Example 2

Flowability and rigidity are lowered and impact resistance at low temperature is also low as compared with those in Example 4, since the rubbery elastomer having the acrylic structure is dispersed in the polylactic acid.

(4) Comparative Example 3

When the amount of blending of the PC resin in a resin mixture comprising components (a-1) and (a-2) is less than 50% by mass, the effect of the impact resistance improvement due to the addition of the rubbery elastomer is limited.

TABLE 1

|  |  |  |  | Example 1 | Example 2 | Example 3 | Example 4 | Comparative example 1 | Comparative example 2 | Comparative example 3 | Comparative example 4 |
|---|---|---|---|---|---|---|---|---|---|---|---|
| Blending Ratio (parts by mass) | (A) | (a-1) | PC-1 | 90 | 70 | 40 | 20 | 90 | 20 |  | 40 |
|  |  |  | PC-2 |  |  | 30 | 30 |  | 30 | 40 | 30 |
|  |  | (a-2) | PLA | 10 | 30 | 30 | 50 | 10 | 50 | 60 | 30 |
|  | (B) |  | Rubbery-elastomer-1 | 3 | 3 | 3 | 5 |  |  | 3 | 25 |
|  |  |  | Rubbery-elastomer-2 |  |  | 2 |  |  | 2 |  |  |
| Evalution | Flexural modulus (MPa) |  |  | 2600 | 2700 | 2700 | 2900 | 2600 | 2700 | 3000 | 220 |
|  | Flowability, SFL (cm) |  |  | 65 | 82 | 75 | 90 | 34 | 70 | 100< | 100< |
|  | Limiting oxygen index (%) |  |  | 23 | 23 | 29 | 25 | 23 | 25 | 23 | 20 |
|  | Appearance of molded Articles |  |  | Excellent | Excellent | Excellent | Excellent | Pearlescent | Excellent | Excellent | Delaminated |
|  | Izod impact strength (23° C.) (kJ/m²) |  |  | 35 | 30 | 70 | 50 | 5 | 70 | 5 | 60 |
|  | Izod impact strength (−30° C.) (kJ/m²) |  |  | 14 | 12 | 15 | 15 | 2 | 2 | 2 | 8 |

The following have become evident from Table 1.

(1) Examples 1 to 4

By dispersing the rubbery elastomer into a PC resin in a resin mixture comprising the PC resin and polylactic acid, flowability of the resin mixture comprising the PC resin and polylactic acid was improved and reduction of rigidity of the resin mixture was suppressed, in addition, not only improvement in the impact resistance at low temperature was achieved which had not been achieved in a rubbery elastomer having the acrylic structure, but also improvement in the defective pearlescent appearance was achieved as a result of diffusion of light due to dispersion of the rubbery elastomer in the PC resin. Further, flame retardancy was also improved by the use of a polycarbonate-silicone copolymer as the PC resin.

Further, by taking a transmission electron micrograph of the resin composition in Example 1, it was confirmed that the rubbery elastomer did not disperse in the polylactic acid. This indicates that the rubbery elastomer-1 is dispersed in the PC resin.

(5) Comparative Example 4

When the amount of blending of the rubbery elastomer is more than 20 parts by mass, poor dispersion causes deamination in molded articles and substantial reduction of rigidity as well.

INDUSTRIAL APPLICABILITY

The present invention can provide a thermoplastic resin composition with high impact resistance at low temperature and such thermoplastic resin composition can be applied to electric and electronic equipment such as office automation equipment, information and communication equipment, home appliances, and the like, the automotive field, the building and construction field, and the like.

The invention claimed is:

1. A thermoplastic resin composition, comprising:
3 to 20 parts by mass of an acrylonitrile-styrene/silicone elastomer (B) relative to 100 parts by mass of a resin mixture (A) comprising 45 to 97% by mass of a polycarbonate resin (a-1) and 55 to 3% by mass of at least one selected from the group consisting of a polylactic acid and a copolymer of at least one lactic acid with at least one other hydroxycarboxylic acid (a-2), wherein the component (B) is dispersed in the component (a-1).

2. The thermoplastic resin composition according to claim 1, wherein the polycarbonate resin of component (a-1) is at least one selected from the group consisting of a polycarbonate-polyorganosiloxane copolymer and a polycarbonate resin containing a polycarbonate-polyorganosiloxane copolymer.

3. A method of preparing molded article, comprising:
molding the thermoplastic resin according to claim 1 to form the molded article.

4. The thermoplastic resin composition according to claim 1, wherein at least one of the polylactic acid and the copolymer of lactic acid is present in an amount of from 10 to 50% by mass.

5. A method of preparing impact resistant office automation equipment comprising applying the thermoplastic resin according to claim 1 to the office automation equipment.

6. Molded articles comprising the thermoplastic resin composition according to claim 1.

7. A method of preparing impact resistant information and communication equipment comprising applying the thermoplastic resin according to claim 1 to the information and communication equipment.

8. A method of preparing an impact resistant automotive part comprising applying the thermoplastic resin according to claim 1 to the automotive part.

9. A method of preparing an impact resistant home appliance comprising applying the thermoplastic resin according to claim 1 to the home appliance.

10. Impact resistant office automation equipment comprising the thermoplastic resin according to claim 1.

11. Impact resistant information and communication equipment comprising the thermoplastic resin according to claim 1.

12. An impact resistant automotive part comprising the thermoplastic resin according to claim 1.

13. An impact resistant home appliance comprising the thermoplastic resin according to claim 1.

14. The thermoplastic resin composition according to claim 1, wherein the acrylonitrile-styrene/silicone elastomer is present in an amount of 3 to 10 parts by mass relative to 100 parts by mass of the resin mixture (A).

15. The thermoplastic resin composition according to claim 1, wherein the acrylonitrile-styrene/silicone elastomer is present in an amount of from 5 to 10 parts by mass relative to 100 parts by mass of the resin mixture (A).

16. The thermoplastic resin composition according to claim 15, wherein the polycarbonate resin (a-1) is present in an amount of from 70 to 90% by mass.

17. The thermoplastic resin composition according to claim 16, wherein at least one of the polylactic acid and the copolymer of lactic acid is present in an amount of from 10 to 50% by mass.

18. The thermoplastic resin composition according to claim 1, comprising the polylactic acid.

19. The thermoplastic resin composition according to claim 1, comprising the copolymer of the lactic acid.

20. The thermoplastic resin composition according to claim 1, wherein the component (a-1) is at least one selected from the group consisting of a polycarbonate-polydimethylsiloxane bisphenol A polycarbonate resin and a bisphenol A polycarbonate resin; and (a-2) is a polylactic acid.

21. The thermoplastic resin composition according to claim 1, wherein the acrylonitrile-styrene/silicone elastomer is present in an amount of from 3 to 5 parts by mass relative to 100 parts by mass of the resin mixture (A).

22. The thermoplastic resin composition according to claim 21, wherein the polycarbonate resin (a-1) is present in an amount of from 60 to 70% by mass.

23. The thermoplastic resin composition according to claim 1, wherein the acrylonitrile-styrene/silicone elastomer is dispersed in the resin mixture (A) in the form of particles having an average particle diameter of 100-500 nm, and the polycarbonate resin and the polylactic acid and/or the copolymer of lactic acid is in the form of a blend.

* * * * *